United States Patent
Christenson et al.

(10) Patent No.: US 8,775,623 B2
(45) Date of Patent: Jul. 8, 2014

(54) AUTOMATIC PORT CONFLICT RESOLUTION DURING APPLICATION DEPLOYMENT

(75) Inventors: David A. Christenson, Fergus Falls, MN (US); Christopher T. Gloe, Rochester, MN (US); John C. Kasperski, Rochester, MN (US); Kevin W. Kirkeby, Rochester, MN (US); Frances E. Stewart, Palisade, MN (US); Alicia L. Williams, Durham, NC (US); Paul A. Wolf, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 574 days.

(21) Appl. No.: 12/473,515

(22) Filed: May 28, 2009

(65) Prior Publication Data

US 2010/0306378 A1    Dec. 2, 2010

(51) Int. Cl.
*G06F 15/173* (2006.01)
*G06F 15/177* (2006.01)

(52) U.S. Cl.
USPC .......................................... 709/226; 709/221

(58) Field of Classification Search
USPC .................................................. 709/226, 221
See application file for complete search history.

(56) References Cited

U.S. PATENT DOCUMENTS

| 6,363,081 | B1 | 3/2002 | Gase |
| 6,934,952 | B2 | 8/2005 | Sarkar et al. |
| 8,046,305 | B1 * | 10/2011 | Barnett et al. ............ 705/78 |
| 2006/0230126 | A1 * | 10/2006 | Bhogal et al. ............ 709/220 |

* cited by examiner

*Primary Examiner* — Patrice L. Winder
*Assistant Examiner* — Ebrahim Golabbakhsh
(74) *Attorney, Agent, or Firm* — Patterson & Sheridan LLP (57) ABSTRACT

Systems, methods and articles of manufacture are disclosed for identifying and resolving port conflicts during application deployment. The port conflicts may be identified based on application documentation and active port information. The port conflicts may be resolved by identifying an available port and providing information about the available port to a conflicting application. The port conflicts may also be resolved by identifying an available IP address and providing a port on the available IP address to a conflicting application. Further, if conflicting applications allow port sharing, the port conflicts may be resolved by providing port sharing information to the conflicting applications.

20 Claims, 9 Drawing Sheets

| Server Application Installer | □ ▣ ✕ |
|---|---|
| Welcome | Verify your applications |
| Verify your applications | Select the applications you want to install on BLUELKVDZD801.rchland.ibm.com. |
| Accept licenses | |
| Configure applications | Select the applications you want to install at this time. |
| Summary | |

| Select | Application | Information | Status |
|---|---|---|---|
| ☐ | Lotus Notes and Domino | Details | Ready |
| ☑ | Lotus Sametime | Details | Ready |
| ☑ | Asterisk | Details | Ready |
| ☑ | Web page serving | Details | Ready |

Details:
Click details next to an application for more information

[< Back]  [Next >]  [Finish]  [Cancel]

Server Application Installer

- Welcome
- Verify your applications
- Accept licenses
- Configure applications
- Summary

Configure applications - Asterisk

Determine if you want the application to run on your private network, public network, or both Applications on your private network can only be accessed from within your company. Applications on your public network are open and accessible to the Internet. Which network or networks do you want this application to use?

○ Private only
○ Public only
⦿ Private and Public

Asterisk will be configured on this server. No additional information is required at this time.

☑ Show detailed network information for this application on the next page.

[ < Back ] [ Next > ]    [ Finish ]    [ Cancel ]

322 (brace around upper content)
304 (brace around lower content)

Server Application Installer

Welcome
Verify your applications
Accept licenses
Configure applications
Summary

Configure applications - Asterisk
Verify the domain name, static IP address and subnet.

These network properties will be set for the application after completing this wizard and clicking Finish.

Application name: Asterisk

*Private IP address:  192 . 168 .  1  . 5
*Private subnet:      255 . 255 . 255 . 0
*Public IP address:   172 .  16 .  3  . 4
*Public subnet:       255 . 255 . 255 . 0

[< Back] [Next >]    [Finish] [Cancel]

AUTOMATIC PORT CONFLICT RESOLUTION DURING APPLICATION DEPLOYMENT

BACKGROUND OF THE INVENTION

1. Field of the Invention

The field of the invention relates to application deployment. More specifically, the field of the invention relates to resolving port conflicts during application deployment.

2. Description of the Related Art

Consolidating applications from a set of servers onto a single server is popular in the Information Technology (IT) industry because doing so brings many benefits. For example, consolidating workloads reduces power consumption, thereby supporting "Green" initiatives. Further, consolidating applications simplifies server administration (i.e., less effort is generally required to manage fewer servers). However, consolidating applications may complicate network administration, especially during deployment of consolidated applications. During deployment, port conflicts may occur which may result in deployment errors and/or deployment termination.

SUMMARY OF THE INVENTION

One embodiment of the invention includes a method for resolving a port conflict when deploying an application, comprising configuring one or more processors to perform an operation. The operation may generally include receiving port configuration information specifying a first port for the first application to use once deployed on a server; identifying a conflict between the port configuration information and a second application that also uses the first port when executed; resolving the port conflict by determining port information for an available port; and deploying the first application using the determined port information instead of using the received port information.

Another embodiment of the invention includes a computer-readable storage medium containing a program, which when executed by the processor is configured to perform an operation for resolving a port conflict when deploying an application. The operation may generally include receiving port configuration information specifying a first port for the first application to use once deployed on a server; identifying a conflict between the port configuration information and a second application that also uses the first port when executed; resolving the port conflict by determining port information for an available port; and deploying the first application using the determined port information instead of using the received port information.

Still another embodiment of the invention includes a system having a processor and a memory containing a program, which when executed by the processor is configured to perform an operation for resolving a port conflict when deploying an application. The operation may generally include receiving port configuration information specifying a first port for the first application to use once deployed on a server; identifying a conflict between the port configuration information and a second application that also uses the first port when executed; resolving the port conflict by determining port information for an available port; and deploying the first application using the determined port information instead of using the received port information.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention generally provide a method and apparatus for identifying and resolving a port conflict when deploying an application. One embodiment of the invention provides a port conflict resolver. The port conflict resolver may identify port conflicts when deploying an application. For example, an application may be deployed with configuration data specifying that the application should use a specific port. However, another application may already be configured to use the specific port when executed (or deployed). Further, the port conflict resolver may resolve the port conflict in various ways. For example, the port conflict resolver may identify an available port and provide information about the available port to a conflicting application. The port conflict resolver may also identify an available IP address and provide information about a port on the available IP address to a conflicting application. Further, if the conflicting applications both allow port sharing, the port conflict resolver may provide port sharing information to the conflicting applications.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
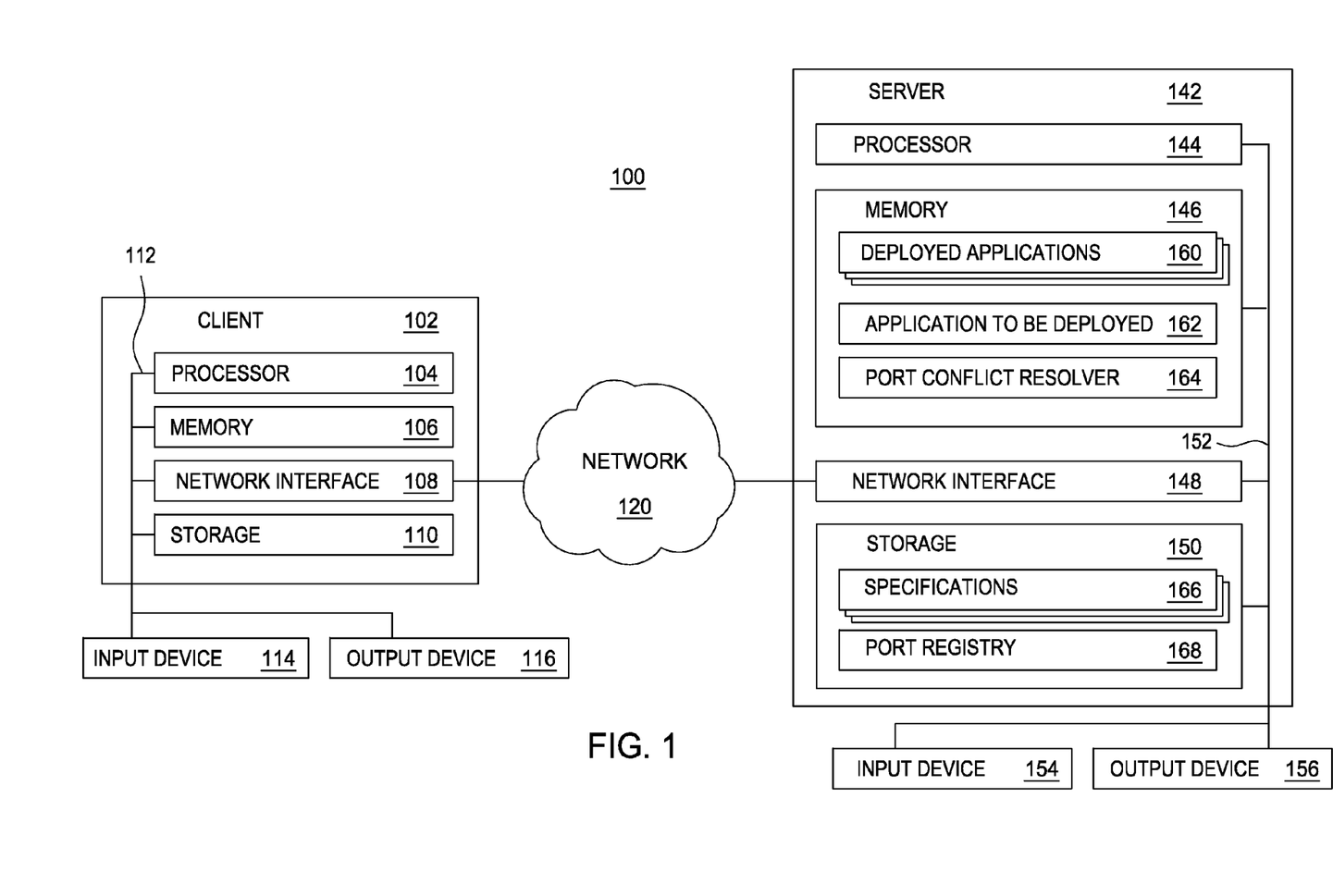
FIG. 1 is a block diagram illustrating a system for resolving port conflicts when deploying an application, according to one embodiment of the invention.

FIG. 1 is a block diagram illustrating a system 100 for resolving port conflicts when deploying an application, according to one embodiment of the invention. The networked system 100 includes a client computer 102 (client) and a server computer 142 (server). The client 102 and the server 142 are connected via a network 120. In general, the network 120 may be a telecommunications network and/or a wide area network (WAN). In a particular embodiment, the network 120 is the Internet.

The client 102 generally includes a processor 104 connected via a bus 112 to a memory 106, a network interface device 108, a storage 110, an input device 114, and an output device 116. The client 102 is generally under the control of an operating system (not shown). Examples of operating systems include UNIX, versions of the Microsoft Windows® operating system, and distributions of the Linux® operating system. (Note: Linux is at trademark of Linus Torvalds in the United States and other countries.) More generally, any operating system supporting the functions disclosed herein may be used.

The memory 106 may be a random access memory. While the memory 106 is shown as a single entity, it should be understood that the memory 106 may in fact comprise a plurality of modules, and that the memory 106 may exist at multiple levels, from high speed registers and caches to lower speed but larger DRAM chips.

The network interface device 108 may be any entry/exit device configured to allow network communications between the client 102 and the server 142 via the network 120. For example, the network interface device 108 may be a network adapter or other network interface card (NIC).

The storage 110 may be a hard disk drive storage device. Although the storage 110 is shown as a single unit, the storage 110 may be a combination of fixed and/or removable storage devices, such as fixed disc drives, floppy disc drives, tape drives, removable memory cards, or optical storage. The memory 106 and the storage 110 may be part of one virtual address space spanning multiple primary and secondary storage devices.

The input device 114 may be any device for providing input to the client 102. For example, a keyboard, keypad, light pen, touch-screen, track-ball, or speech recognition unit, audio/video player, and the like may be used.

The output device 116 may be any device for providing output to a user of the client 102. For example, the output device 116 may be any conventional display screen or set of speakers, along with their respective interface cards, i.e., video cards and sound cards (not shown).

The server 142 generally includes a processor 144 connected via a bus 152 to a memory 146, a network interface device 148, a storage 150, an input device 154, and an output device 156. The processor 144 could be any hardware processor used to perform an embodiment of the invention.

Like the memory 106, the memory 146 may be a random access memory sufficiently large to hold the necessary programming and data structures of the invention. The programming and data structures may be accessed and executed by the processor 144 as needed during operation. While the memory 146 is shown as a single entity, it should be understood that the memory 146 may in fact comprise a plurality of modules, and that the memory 146 may exist at multiple levels, from high speed registers and caches to lower speed but larger DRAM chips.

Like the network interface device 108, the network interface device 148 may be any entry/exit device configured to allow network communications between the client 102 and the server 142 via the network 120. For example, the network interface device 148 may be a network adapter or other network interface card (NIC).

Like the storage 110, the storage 150 may be a hard disk storage device. Although the storage 150 is shown as a single unit, the storage 150 may be a combination of fixed and/or removable storage devices, such as fixed disc drives, floppy disc drives, tape drives, removable memory cards, or optical storage. The memory 146 and the storage 150 may be part of one virtual address space spanning multiple primary and secondary storage devices.

Like the input device 114, the input device 154 may be any device for providing input to the client 102. For example, a keyboard, keypad, light pen, touch-screen, track-ball, or speech recognition unit, audio/video player, and the like may be used.

Like the output device 116, the output device 156 may be any device for providing output to a user of the server 142. For example, the output device 156 may be any conventional display screen or set of speakers, along with their respective interface cards, i.e., video cards and sound cards (not shown).

As shown, the memory 146 includes deployed applications 160, an application 162 to be deployed, and a port conflict resolver 164. Deployed applications 160 include applications that have been installed and configured for operation on the server 142. A deployed application may be configured to interact with other applications on the server 142 (e.g., an application server, web server, or a database) and to accept requests from the client 102. Alternatively, multiple deployed applications may coexist on the same server relatively independent of one another. Further, a deployed application may be assigned resources as part of deployment. For example, a database may be created according to a particular schema as part of application deployment. Further, the deployed application may be configured to use a specified IP address and port (i.e., a socket) to communicate with other elements on the server 142 (e.g., a socket for an application server to talk to a database server). In addition, the deployed application may also be configured to listen for client requests on a specified IP address and port. The application 162 may be an application that is about to be deployed on server 142. The port conflict resolver 164, when executed on processor 144, detects and resolves port conflicts between the application 162 and the deployed applications 160. FIGS. 2 through 5 and associated descriptions detail the structure and operation of the port conflict resolver 164.

As shown, the storage 150 includes specifications 166 and a port registry 168. Each specification 166 may store port information for one or more of the deployed applications 160. The port registry 168 may contain port information from the specifications 166 in addition to detected port information for deployed applications for which no specification was provided.

Although embodiments are described herein with reference to a client-server network model, network models other than client-server, such as peer-to-peer, are broadly contemplated.

Figure 2:
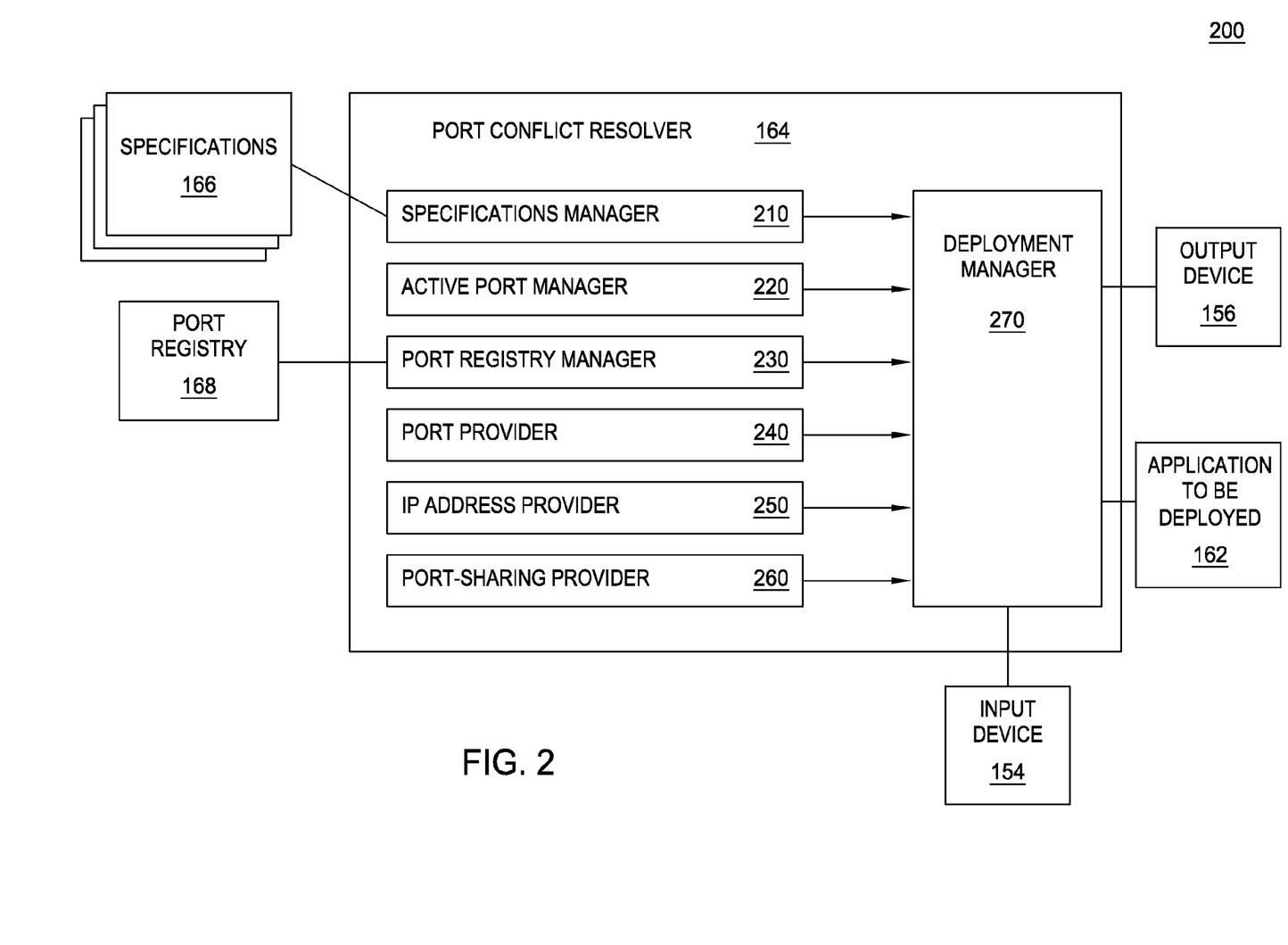
FIG. 2 is a block diagram illustrating a functional view of a port conflict resolver, according to one embodiment of the invention.

FIG. 2 is a block diagram illustrating a functional view 200 of the port conflict resolver 164 of FIG. 1, according to one embodiment of the invention. As shown, the port conflict resolver 164 includes a specifications manager 210, an active port manager 220, a port registry manager 230, a port provider 240, an Internet Protocol (IP) address provider 250, a port-sharing provider 260, and a deployment manager 270.

In one embodiment, the specifications manager 210 receives specifications 166 from a user and provides information contained in the specifications 166 to the port registry manager 230. For example, a user deploying an application 162 on the server 142 may provide a specification 166 for the application 162. In another embodiment, the specifications manager 210 receives specifications 166 from an application as part of application deployment (e.g., from a deployment descriptor for an application). The specification 166 describes any ports that the application 162 is configured to use. The specification 166 may also include other information, such as an interface (e.g., public network or private network), IP address/hostname, subnet mask, protocol, whether the application 162 allows a different port to be used, whether the application 162 allows a different IP address to be used, and whether the application 162 allows port sharing. Table I shows an illustrative specification 166 for an application 162:

TABLE I

Specifications example

| Application: | Application A |
|---|---|
| Port number/range: | 80 |
| Protocol: | TCP |
| Interface: | Device 0 (private network) |
| IP address/hostname: | 10.0.0.1 |
| Subnet mask: | 255.255.255.0 |
| Other port allowed? | Yes |
| Other IP address allowed? | Yes |
| Port sharing allowed? | No |

A user deploying "Application A" on the server 142 may provide a specification 166 such as shown in the above example. Information in the specification 166 may also come from documentation (such as vendor product documentation or user-generated documentation) for Application A. The specification 166 provides that Application A is configured to use the Transmission Control Protocol (TCP) on port 80. In one embodiment, a user may specify a range of port numbers that an application is configured to use.

The specification 166 further provides that Application A is configured to bind to network interface device 0 (which, in the example, is for a private network). In one embodiment, a user may specify that an application binds to a network interface device for a public network. Further, a user may also specify that an application binds to all available network interface devices (e.g., Interface: *).

Moreover, the specification 166 provides that Application A is configured to use the IP address 10.0.0.1 with a subnet mask of 255.255.255.0. In one embodiment, a user may provide a hostname (or domain name) in lieu of an IP address. A user may also specify that an application does not require any specific IP address (e.g., IP address: n/a). Further, a user may specify that an application binds to all active IP addresses on an interface (e.g., IP address: *).

In this specific example, the specification 166 indicates that Application A allows other ports and other IP addresses, but does not allow port sharing. For example, if Application A is configured to use ports other than port 80, a user deploying Application A (or a deployment descriptor included with a deployment package for Application A) may specify that other ports are allowed. Similarly, if Application A is configured to use IP addresses other than 10.0.0.1, a user may specify that other IP addresses are allowed. Further, if Application A does not support port sharing, a user may specify that port sharing is not allowed.

Although embodiments are described herein with reference to a specification 166 for Application A containing information for only a single port (port 80), those skilled in the art will recognize that a specification 166 for Application A may contain information for multiple ports (e.g., port 80, port 443, etc.). The specification 166 for Application A may also contain any associated information (e.g., protocol, interface, etc.) for each port. Further, embodiments of the invention may be adapted to support specifications 166 that contain less information than shown in Table I. For example, a user may provide a specification 166 in which the only information provided is a port number and a protocol (i.e., all other fields in the specification are optional and are left blank by the user). Moreover, although embodiments are described herein with reference to resolving port conflicts in deploying an application, those skilled in the art will recognize that embodiments of the invention may be adapted to support resolving port conflicts in deploying multiple applications. For example, if a user is deploying multiple applications (for example, Applications A, B, and C) at once on the server 142, the port conflict resolver 164 may resolve any port conflicts among the multiple applications and any deployed applications on the server 142.

Further, information in a specification 166 for an application may be provided by different types of users, according to one embodiment. For example, a first user (e.g., a vendor or developer) of an application may specify whether the application binds to a single address, a list of addresses, or all IP addresses on a system (without specifying actual IP addresses, because IP addresses may vary from customer to customer). Subsequently, a second user (e.g., a customer)

deploying the application may specify one or more actual IP addresses and port numbers for deploying the application.

In one embodiment, the active port manager 220 identifies active ports on the server 142 and provides information about identified active ports to the port registry manager 230. For example, the active port manager 220 may call an operating system library function to identify active TCP and UDP ports on the server 142. A user may have previously provided information for an active port via a specification 166. However, there may be active ports not described by any specification 166. For example, a user may have neglected to provide a specification 166 for a deployed application 160. Further, a deployed application 160 may bind to an additional port not expected by a user and/or not described in documentation for the deployed application 160. Table II shows an illustrative list of active ports on a server 142:

TABLE II

Active ports example

| Network interface | IP address | Active port | Protocol | Application |
|---|---|---|---|---|
| Device 0 (private) | 10.0.0.1 | 80 | TCP | Application X |
| Device 0 (private) | 10.0.0.1 | 53 | TCP | Application X |
| Device 0 (private) | 10.0.0.1 | 53 | UDP | Application X |
| Device 0 (private) | 10.0.0.2 | 80 | TCP | Application Y |
| Device 1 (public) | 2.0.0.1 | 80 | TCP | Application Y |

As shown in the above example, the list of active ports provides that TCP ports 53 and 80 for 10.0.0.1 on Device 0 are in use by Application X. Further, the list of active ports provides that UDP port 53 for 10.0.0.1 on Device 0 is also in use by Application X. In addition, TCP port 80 for 10.0.0.2 on Device 0 is in use by Application Y. Moreover, TCP port 80 for 2.0.0.1 on Device 1 is also in use by Application Y.

In one embodiment, the port registry manager 230 receives information from the specifications manager 210 and from the active port manager 220 and maintains a port registry 168. The deployment manager 270 may use the port registry 168 to determine which ports are unavailable. In one embodiment, a port is only available if the port is neither active nor registered. A registered port is a port that is described in a specification 166 of a deployed application 160. A proposed port refers to a port described in a specification 166 of an application 162 to be deployed (i.e., an application that has not yet been deployed). Table III shows exemplary logic for port availability:

TABLE III

Port availability example

| Active | Registered | Available |
|---|---|---|
| Yes | Yes | No |
| Yes | No | No |
| No | Yes | No |
| No | No | Yes |

According to the above example, a port that is active or registered is not available for use by an application 162 on the server 142. Only an unregistered, inactive port is available for use by the application 162. In another embodiment, a registered, inactive port may nevertheless be designated as "available."

In one embodiment, port information described in a specification 166 of an application 162 to be deployed may be added to the port registry 168 as a "proposed" port to facilitate identifying port conflicts. If "proposed port" entries are added to the port registry 168, the port conflict resolver 164 may identify port conflicts based on information in the port registry 168 (i.e., without having to consider information in specifications 166). In another embodiment, the port conflict resolver 164 may also identify port a conflict among deployed applications 160. In resolving a port conflict, the port conflict resolver 164 may attempt to reconfigure and/or redeploy a deployed application 160. Table IV shows an illustrative port registry 168:

TABLE IV

Port registry example

| Type | IP address | Port | Protocol | Application |
|---|---|---|---|---|
| Registered | 10.0.0.1 | 110 | TCP | Application W |
| Registered | 10.0.0.1 | 80 | TCP | Application X |
| Active | 10.0.0.1 | 80 | TCP | Application X |
| Active | 10.0.0.1 | 53 | TCP | Application X |
| Active | 10.0.0.1 | 53 | UDP | Application X |
| Active | 10.0.0.2 | 80 | TCP | Application Y |
| Active | 2.0.0.1 | 80 | TCP | Application Y |
| Active | ALL | 443 | TCP | Application Z |
| Proposed | 10.0.0.1 | 80 | TCP | Application A |

The port registry manager 230 may maintain a port registry 168 such as shown in the above example. For simplicity, the above example does not include fields such as subnet mask, network interface, whether another port is allowed, whether another IP address is allowed, and whether a port sharing is allowed. The port registry 168 includes information received from the specifications manager 210 and the active port manager 220. That is, the port registry 168 includes information on active ports, registered ports, and proposed ports.

As shown in Table IV, TCP port 110 for 10.0.0.1 is registered by Application W. Further, TCP port 80 for 10.0.0.1 is registered by Application X. Moreover, TCP ports 80 and 53 for 10.0.0.1 are in use by Application X. UDP port 53 for 10.0.0.1 is also in use by Application X. In addition, TCP port 80 for 10.0.0.2 is in use by Application Y. TCP port 80 for 2.0.0.1 is also in use by Application Y. That is, the specifications manager 210 did not receive a specification 166 for Application Y. Further, the specification 166 for Application X did not register TCP port 53 or UDP port 53 for 10.0.0.1. Similarly, TCP port 443 for all IP addresses is in use by Application Z, even though the specifications manager 210 did not receive a specification 166 for Application Z. In addition, although the active port manager 220 did not detect that TCP port 110 for 10.0.0.1 was in use, the specifications manager 210 received a specification 166 that describes TCP port 110 for 10.0.0.1 as being used by Application W.

In one embodiment, during deployment of an application, the port registry manager 230 identifies a port conflict by detecting that a "Proposed" port in the port registry 168 conflicts with an "Active" port, a "Registered" port, or another "Proposed" port. In one embodiment, a port conflict occurs when two applications specify an identical IP address, port, and protocol. For example, the last row in Table IV is for a "Proposed" port that conflicts with the second row in Table IV. That is, the last row and the second row in Table IV specify an identical IP address, port, and protocol. Put another way, Application A and Application X both specify TCP port 80 for 10.0.0.1.

In one embodiment, the port provider 240 receives information from the port registry manager 230 and presents an available port to the deployment manager 270. For example, suppose a user is deploying Application A on the server 142 and submits the specification 166 of Table I. This specification 166 indicates that Application A is configured to use TCP port 80 on 10.0.0.1. In one embodiment, the same is reflected as a "Proposed" port in Table IV. Suppose further that the port registry manager 230 indicates that TCP port 80 on 10.0.0.1 is not available. For instance, the port registry 168 of Table IV indicates that TCP port 80 on 10.0.0.1 is in use by Application X. That is, there is a port conflict (TCP port 80 on 10.0.0.1) between Application X and Application A. If a user were to deploy Application A regardless of the port conflict, Application A may experience deployment errors. The deployment errors may lead to termination of the deployment of Application A. Even if no deployment errors occur, Application A may not function correctly once deployed (or may cause a conflicting application not to function correctly).

If the specification 166 for Application A indicates that a different port may be used, the port provider 240 may determine an available port based on information from the port registry manager 230, according to one embodiment. Continuing the above example, the port provider 240 may determine that TCP port 8080 on 10.0.0.1 is available. The port provider 240 presents the available port (i.e., TCP port 8080 on 10.0.0.1) to the deployment manager 270 for use in deploying Application A.

In one embodiment, the IP address provider 250 receives information from the port registry manager 230 and presents an available IP address to the deployment manager 270. Continuing the example described in conjunction with the port provider 240, suppose that the specification 166 for Application A indicates that a different port is not allowed (i.e., suppose "Other port allowed?" is "No" in Table I). Put another way, the port conflict between Application X and Application A may not be resolved by selecting a different port for Application A.

If the specification 166 for Application A indicates that a different IP address may be used, the IP address provider 250 may determine an IP address for which the port sought by Application A is available. For example, the IP address provider 250 may determine that TCP port 80 on 10.0.0.4 is available. The IP address provider 250 may determine the IP address based on information from the port registry manager 230 and from verifying availability of IP addresses. For instance, the IP address provider 250 may verify the availability of IP addresses by using a protocol such as Address Resolution Protocol (ARP), Neighbor Discovery Protocol (NDP), and the like.

Continuing the above example, the IP address provider 250 determines that TCP port 80 on 10.0.0.2 is not available, based on information from the port registry manager 230. That is, referring to Table IV, TCP port 80 on 10.0.0.2 is in use by Application Y. The IP address provider 250 may send an ARP request to discover that IP address 10.0.0.3 is in use by another computer on the network. That is, Application A may not use IP address 10.0.0.3, regardless of whether TCP port 80 on 10.0.0.3 is in use. Further, the IP address provider 250 may send an ARP request to discover that IP address 10.0.0.4 is not in use on the network. The IP address provider 240 presents the available IP address and port (i.e., TCP port 80 on 10.0.0.4) to the deployment manager 270 for use in deploying Application A.

In one embodiment, the port-sharing provider 260 presents port sharing information to the deployment manager 270. The port sharing information may be used to configure two or more applications with a port conflict to share a port. An example of a port sharing solution is any proxy solution (e.g., a reverse HTTP proxy). For example, network traffic may be intercepted by a reverse HTTP proxy and forwarded to Application A or Application X based on predefined rules. In another solution, the same traffic may be forwarded to both Application A and Application X, allowing Application A and Application X to determine what traffic is relevant (and what should be ignored).

Continuing the above example, suppose that the specification 166 for Application A indicates that neither a different port nor a different IP address is allowed (i.e., suppose "Other port allowed?" and "Other IP address allowed?" are both "No" in Table I). Further, suppose that the specifications 166 for both Application A and Application X indicate that a port sharing is allowed (i.e., suppose "Port sharing allowed?" is "Yes" in Table I). The port-sharing provider 260 may resolve the port conflict with a port sharing solution. The port sharing solution may include configuring and deploying Application A with a new IP address and port combination. The new IP address and port combination may include a new IP address, a new port, or both. The port sharing solution may also include reconfiguring and/or redeploying Application X with a new IP address and port combination. Table V shows illustrative port sharing information:

TABLE V

Port sharing example

| Application | IP address | Port | Protocol |
| --- | --- | --- | --- |
| Before port sharing (port conflict exists) | | | |
| Application X | 10.0.0.1 | 80 | TCP |
| Application A | 10.0.0.1 | 80 | TCP |
| After port sharing (port conflict resolved via reverse proxy) | | | |
| Reverse proxy | 10.0.0.1 | 80 | TCP |
| Application X | 10.0.0.251 | 49152 | TCP |
| Application A | 10.0.0.252 | 49153 | TCP |

As shown, prior to a port sharing solution, a port conflict exists between Application X and Application A over TCP port 80 for 10.0.0.1. The port-sharing provider 260 presents port sharing information to the deployment manager 270. For example, the port sharing information may indicate that a reverse proxy is available that uses TCP port 80 for 10.0.0.1. For example, a reverse proxy may be provided by an operating system or by another application. The port sharing information may also indicate that the reverse proxy may forward traffic to two new ports. The two new ports include TCP port 49152 for 10.0.0.251 and TCP port 49153 for 10.0.0.252. Accordingly, Application X and Application A may be configured to use the two new ports.

In one embodiment, the reverse proxy may forward traffic based on any criteria available to the reverse proxy (e.g., load balancing criteria, etc.). Further, the reverse proxy may also forward traffic based on a set of predefined rules. Suppose Application X is a web server. In addition, suppose Application A is a web-based email server. Continuing the example in Table V, Table VI shows illustrative reverse proxy rules:

TABLE VI

Reverse proxy rule example

| URI contains | IP address | Port | Protocol |
| --- | --- | --- | --- |
| /Mail/* | 10.0.0.252 | 49153 | TCP |
| /* | 10.0.0.251 | 49152 | TCP |

As shown, a rule for HTTP traffic may specify that an HTTP request whose Uniform Resource Identifier (URI) contains "/Mail/" is forwarded to TCP port 49153 for 10.0.0.252.

Further, a second rule may specify that all other HTTP requests are forwarded to TCP port 49152 for 10.0.0.251. In effect, requests with "/Mail" URIs received on TCP port 80 for 10.0.0.1 are forwarded to Application A, the web-based email server. All other requests received on TCP port 80 for 10.0.0.1 are forwarded to Application X, the web server. Taken together, the port conflict is resolved by allowing Application A and Application X to share TCP port 80 for 10.0.0.1.

In one embodiment, the deployment manager 270 receives information from the port registry manager 230, the port provider 240, the IP address provider 250, and the port-sharing provider 260. Further, the deployment manager 270 receives user input via the input device 154, according to one embodiment. The user input may include user approval to deploy an application 162 using a given set of port information. The port information may include application name, interface (e.g., public network or private network), IP address/hostname, subnet mask, protocol, and the like. The deployment manager 270 outputs the port information to the output device 156.

In one embodiment, the deployment manager requests approval from a user to deploy the application 162 using the port information. That is, the user deploying the application 162 on the server 142 may review and approve of the port information. The deployment manager 270 may receive a user approval via the input device 154 (e.g., a user may click on an "Approve" button of a GUI).

The user may also change any of the port information, according to one embodiment. For example, suppose that a user is deploying Application A on server 142. Suppose the port conflict resolver 164 detects a port conflict between Application A and Application X over TCP port 80 on 10.0.0.1. Suppose further that the port conflict resolver 164 determines that TCP port 80 on 10.0.0.4 is available for use by Application A. The deployment manager 270 may output port information (i.e., that Application A may use TCP port 80 on 10.0.0.4 to resolve the port conflict) to the output device 156. A user may review and change the port information. For example, if a user does not wish Application A to use TCP port 80, a user may specify TCP port 8080 to be used instead of TCP port 80. In another example, a user may specify IP address 10.0.0.5 to be used instead of 10.0.0.4.

In one embodiment, the deployment manager 270 receives, via the input device 154, any changes to the port information. Further, the port registry manager 230, the port provider 240, the IP address provider 250, and the port-sharing provider 260 may determine whether the changed port information poses any port conflicts. In one embodiment, if a port conflict exists, the port conflict resolver 164 attempts to resolve the conflict, and the process repeats. If no port conflict exists, the deployment manager 270 may request a final approval from the user or deploy Application A.

Once user approval is received, the deployment manager 270 may deploy an application 162, according to one embodiment. Deploying an application 162 may include any or all of providing port information to the application 162, configuring the application 162 with port information, installing the application 162, and executing the application 162. Further, the deployment manager 270 may configure a firewall to allow ports for a newly deployed application, according to one embodiment. For example, the deployment manager 270 may configure a firewall programmatically. In some cases, the deployment manager 270 may use a protocol such as Universal Plug and Play (UPnP) to configure a firewall. Further, the deployment manager 270 may generate a message for a system administrator. The message may include port information for the newly deployed application. The system administrator may use the port information to update any firewalls (such as any external firewalls or client firewalls) that cannot be updated programmatically.

In one embodiment, the port conflict resolver 164 may also allow a user to deploy an application with (i.e., despite) a port conflict. For example, although the port conflict resolver 164 may detect a port conflict between two applications, a user may never run the two applications simultaneously. In this specific example, the port conflict may not occur even if the two applications are deployed.

Figure 3A:
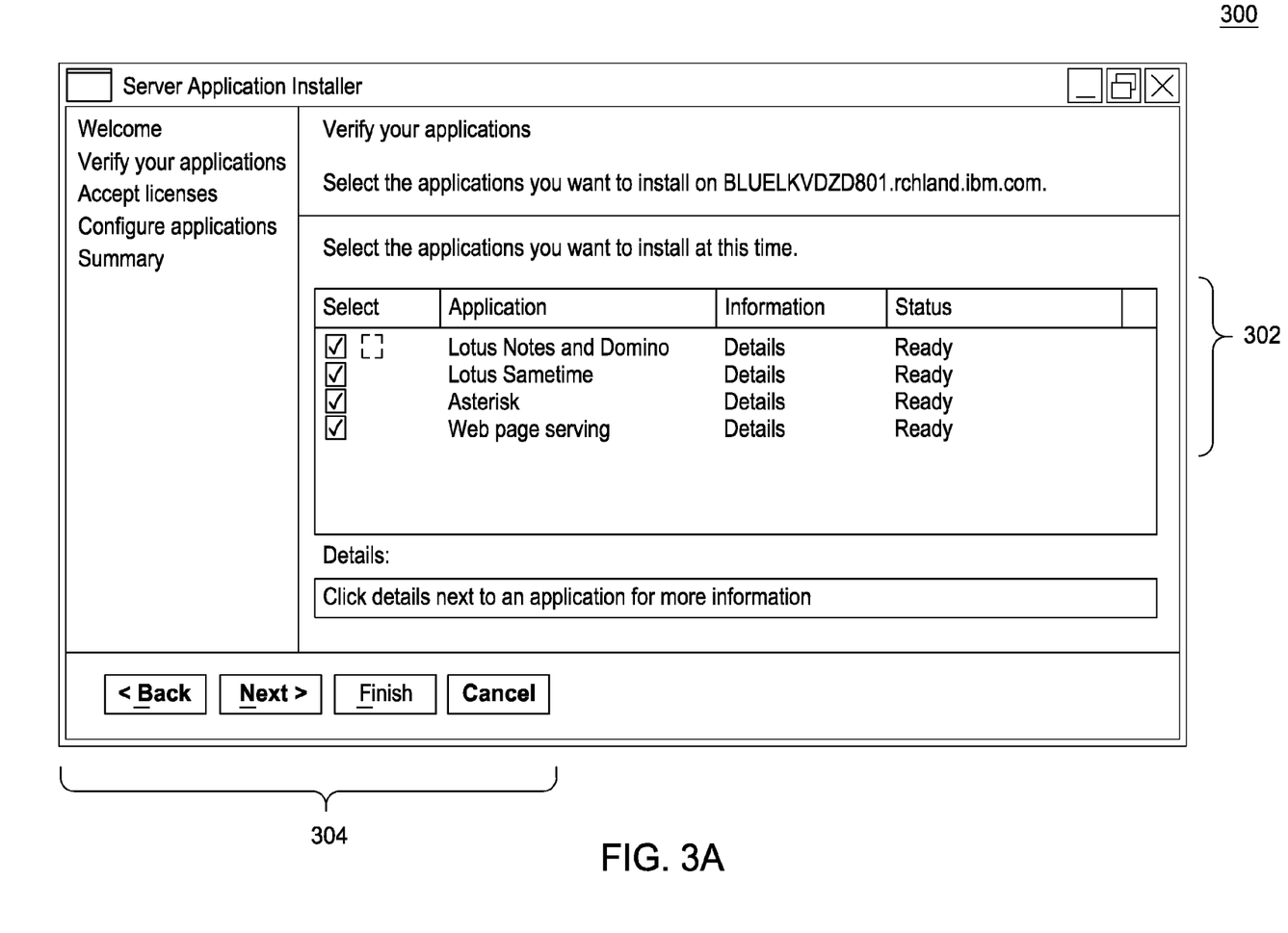
FIGS. 3A-3D illustrate graphical user interfaces (GUIs) for a port conflict resolver, according to one embodiment of the invention.

FIGS. 3A-3D illustrate GUIs for a port conflict resolver 164 of FIG. 1, according to one embodiment of the invention. FIG. 3A illustrates a GUI 300 that includes an application selection pane 302 and command buttons 304. The selection pane 302 allows a user to specify which applications to deploy on the server 142. As shown, four applications are available for deployment. The four applications are "Lotus Notes and Domino®", "Lotus Sametime®", "Asterisk®", and "Web page serving." As shown, the user has specified to deploy all of the four applications. The command buttons 304 allow a user to navigate to a next step in deployment (e.g., by clicking on the "Next" button), navigate to a previous step in deployment (e.g., by clicking on the "Back" button), or cancel deployment (e.g., by clicking on the "Cancel" button).

Figure 3B:
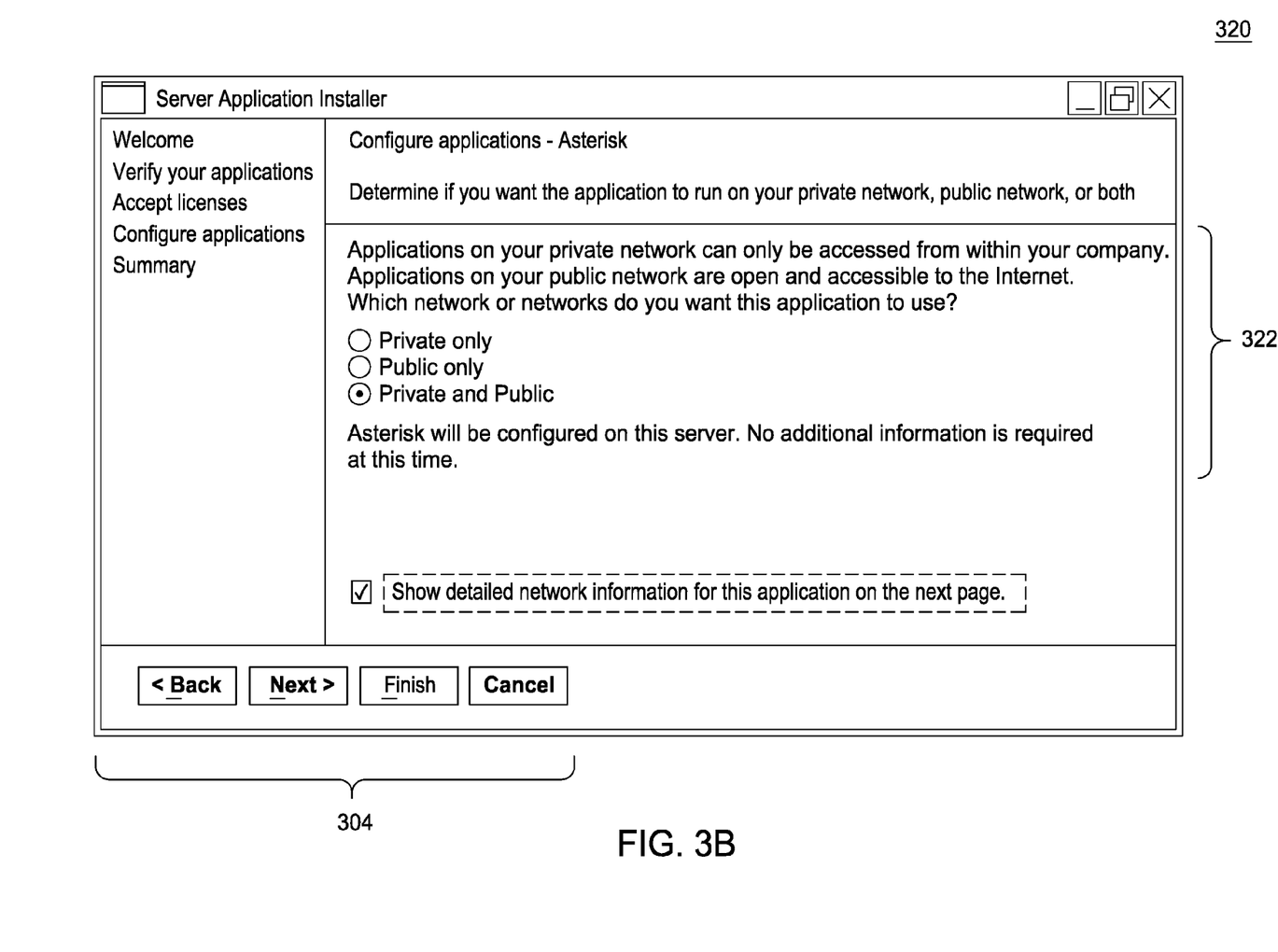

FIG. 3B illustrates a GUI 320 that includes a network selection pane 322 and command buttons 304. For example, GUI 320 may be displayed when a user clicks on the "Next" button of GUI 300 in FIG. 3A. The network selection pane 322 allows a user to specify the networks for which the applications 162 should be deployed. In one embodiment, the network selection pane 322 allows a user to specify a network interface device 148 for which the applications 162 should be deployed. Specifying a network may be synonymous with specifying a network interface device when each network interface device belongs to a network. As shown, the user has specified to deploy the applications 162 for both private and public networks. For example, the private and public networks correspond to Device 0 (private) and Device 1 (public) of Tables I and II.

Figure 3C:
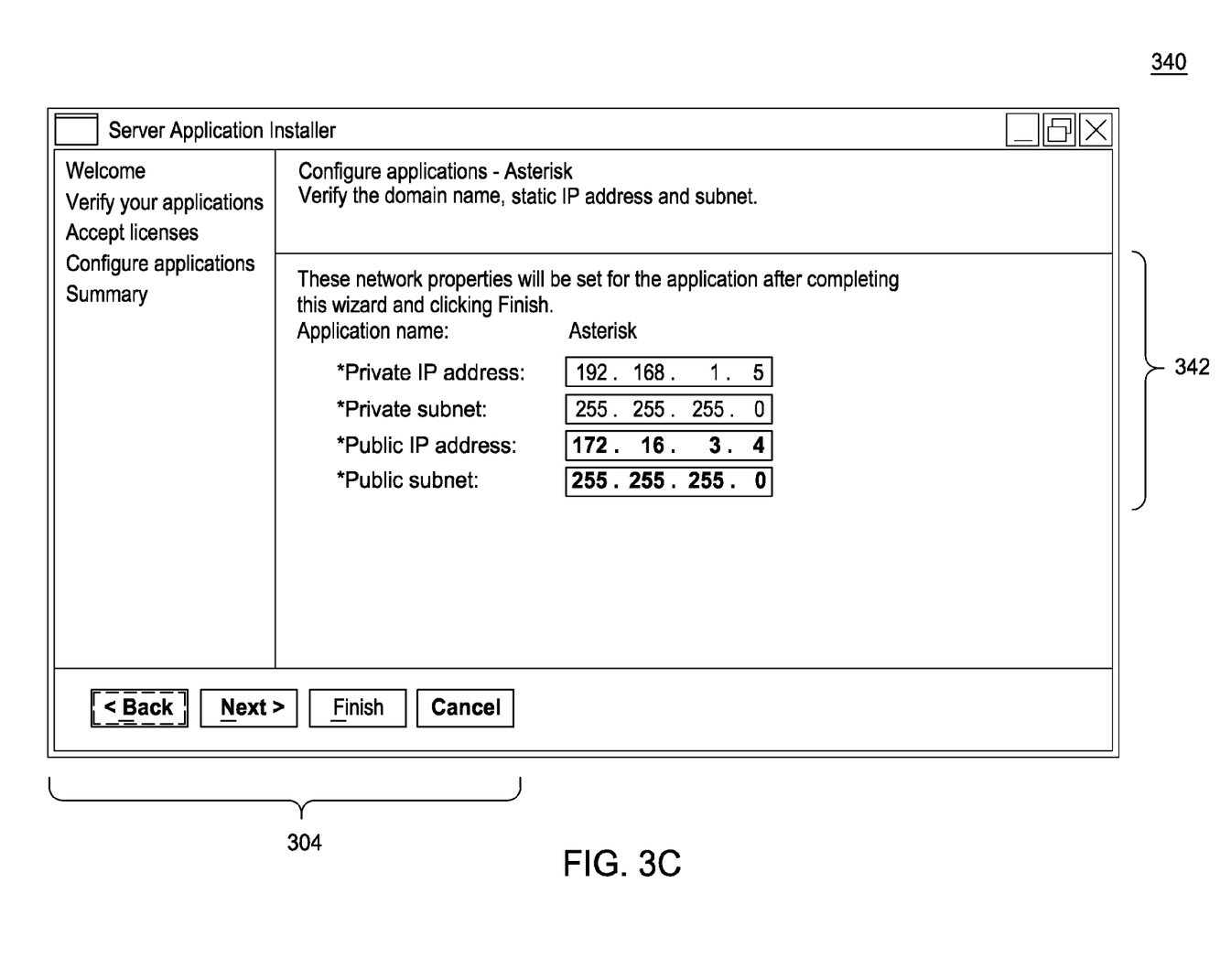

FIG. 3C illustrates a GUI 340 that includes a configuration pane 342 and command buttons 304. For example, GUI 340 may be displayed when a user clicks on the "Next" button of GUI 320 in FIG. 3B. The configuration pane 342 allows a user to review and/or change port information for the applications 162. Suppose that the port conflict resolver 164 detected that the Asterisk® application is involved in a conflict over a port P for a public IP address of 9.10.105.4. Suppose further that the specification 166 for the Asterisk® application indicates that no other port number (other than P) may be used. The port conflict resolver 164 may determine a new public IP address for the Asterisk® application (such as 9.10.105.5) for which port P is available. As shown, the port conflict resolver 164 is requesting user approval to deploy the Asterisk® application with a public IP address of 9.10.105.5, and a public subnet mask of 255.255.255.0, a private IP address of 192.168.1.5, and a private subnet mask of 255.255.255.0. As shown, the user may also specify a new public IP address for the Asterisk® application (such as 9.10.105.6).

Figure 3D:
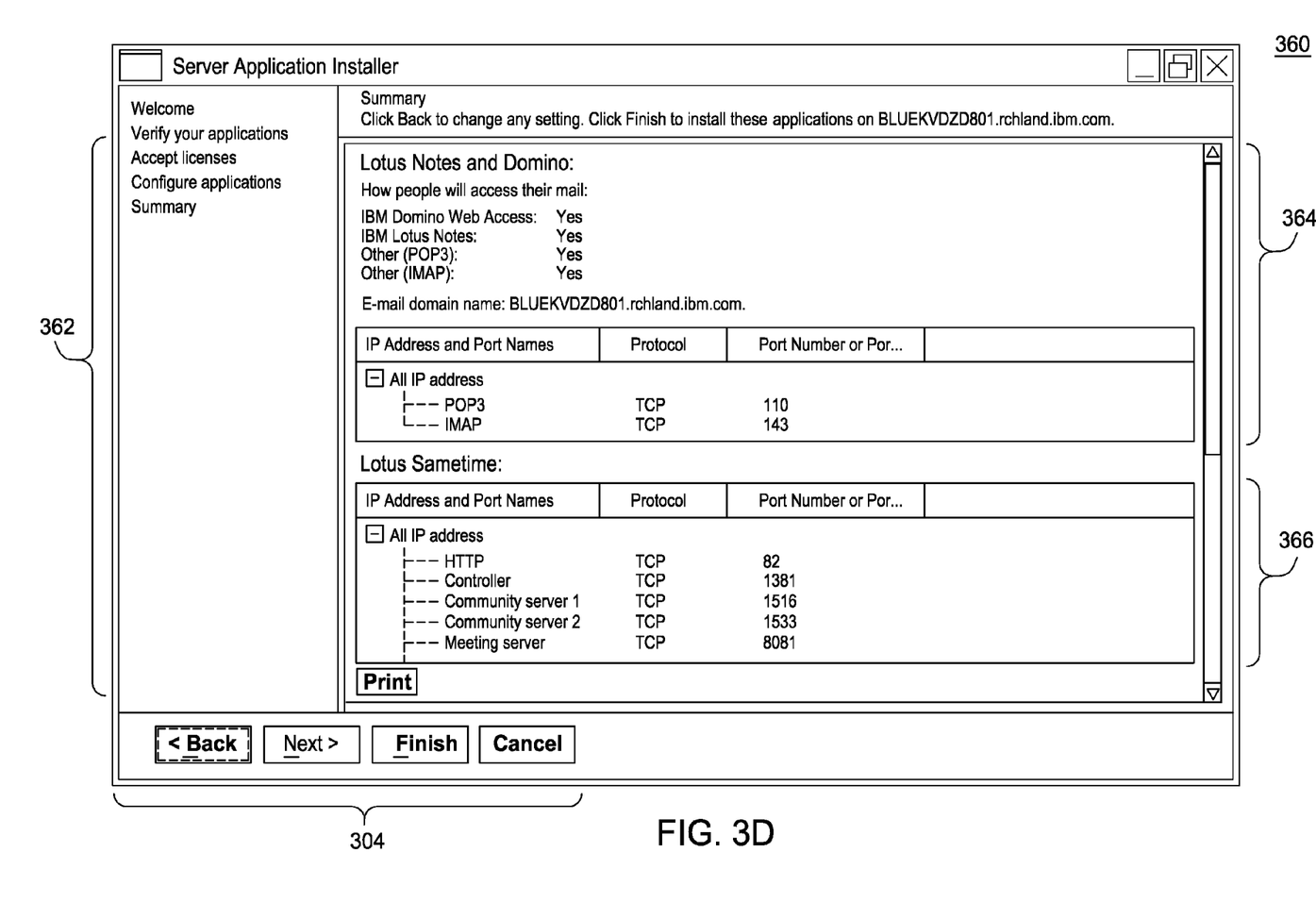

FIG. 3D illustrates a GUI 360 that includes a port information summary 362 and command buttons 304. For example, GUI 360 may be displayed when a user clicks on the "Next" button of GUI 340 in FIG. 3C. In one embodiment, the port conflict resolver 164 may output a port information summary 362 for applications 162 and request final approval from a user. As shown, the port information summary 362 includes at least a summary 364 for the Lotus Notes® and Domino® application and a summary 366 for the Lotus Sametime® application. The user may review the port information summary 362 and click on the "Finish" button to approve of deploying the applications 162.

Figure 4:
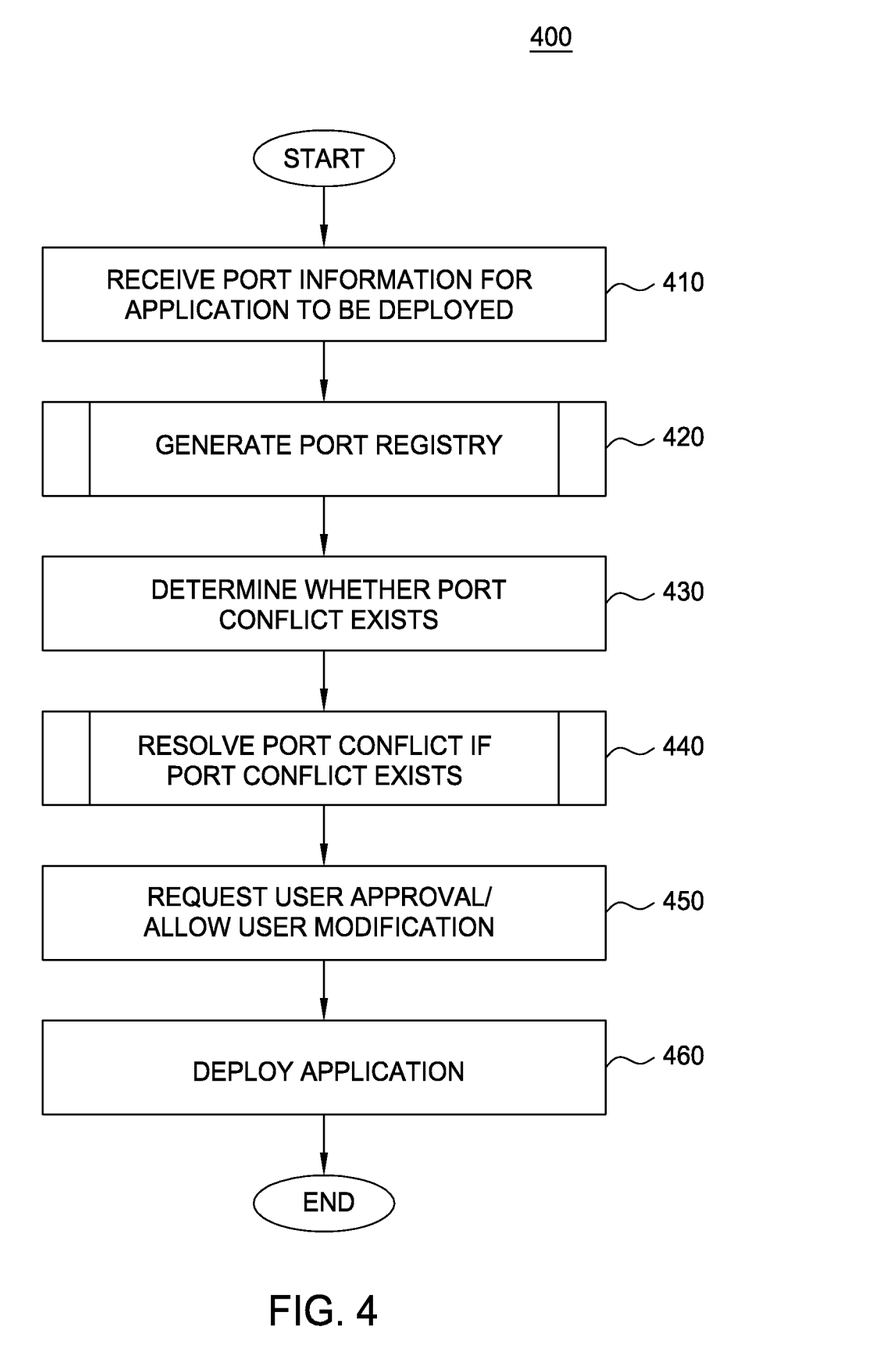
FIG. 4 is a flowchart depicting a method for detecting and resolving a port conflict when deploying an application, according to one embodiment of the invention.

FIG. 4 is a flowchart depicting a method 400 for detecting and resolving a port conflict when deploying an application 162, according to one embodiment of the invention. The method 400 may be performed by the port conflict resolver 164 of FIG. 1. The steps of the method 400 are described in conjunction with the specification example of Table I and the port registry example of Table IV.

As shown, the method 400 begins at step 410, where the port conflict resolver 164 receives port information for an application 162 to be deployed. For example, the port information in Table I may be received for the application 162. At step 420, the port conflict resolver 164 generates a port registry 168. For example, the port registry of Table IV may be created. Further, the port registry 168 may be a persistent port registry maintained across separate, independent application deployments on the server 142. That is, the port conflict resolver 164 may access an existing port registry 168 instead of creating a port registry 168. At step 430, the port conflict resolver 164 determines whether a port conflict exists. For example, the port conflict resolver 164 may compare entries in the port registry of Table IV to determine whether a port conflict exists. At step 440, the port conflict resolver 164 resolves a port conflict, if a port conflict exists. For example, the port conflict resolver 164 may attempt to resolve the port conflict by providing the application 162 with a new port number, a new IP address, etc.

At step 450, the port conflict resolver 164 requests user approval and allows user modification of port information determined by the port conflict resolver 164 in resolving the port conflict. For example, a user may approve of the port information or modify an IP address in the port information.

Port information modified by a user may nevertheless create another port conflict. The port conflict resolver 164 may detect such port conflicts by similarly modifying the row for the corresponding "Proposed" port in the port registry 168. That is, the port conflict resolver 164 may make the same modification to the port registry 168 that the user made to the port information via the GUI. Once the port registry 168 is modified, the port conflict resolver 164 may once again compare entries in the port registry 168 to detect any conflicts.

At step 460, the port conflict resolver 164 deploys the application 162. For example, the port conflict resolver 164 may provide the port information to the application 162, configure the application 162 with the port information, install the application 162, and execute the application 162. After step 460, the method 400 terminates.

Figure 5:
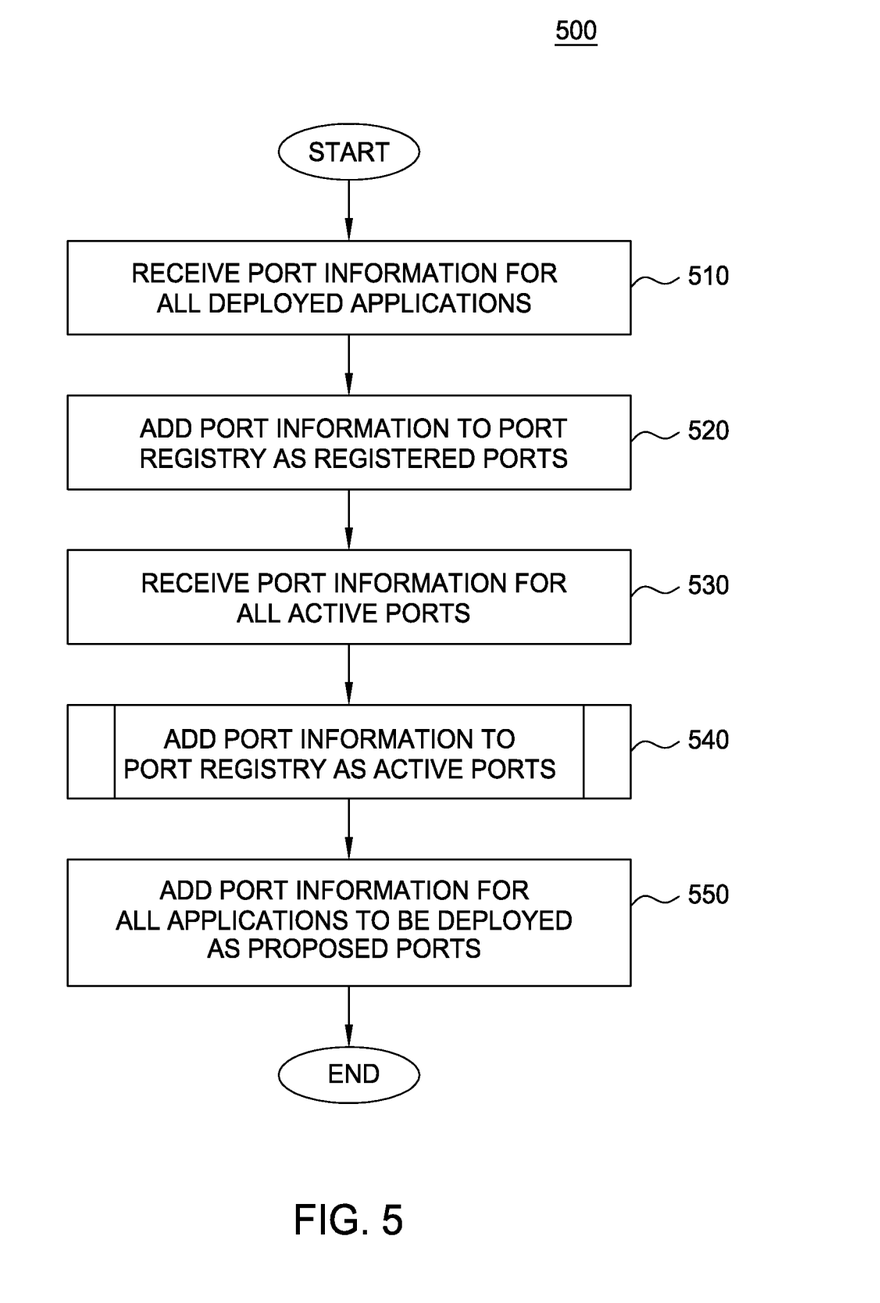
FIG. 5 is a flowchart depicting a method for creating a port registry, according to one embodiment of the invention.

FIG. 5 is a flowchart depicting a method 500 for creating a port registry 168, according to one embodiment of the invention. The method 500 may be performed by the port conflict resolver 164 of FIG. 1, according to one embodiment. The steps of method 500 correspond to step 420 of FIG. 4 and are described in conjunction with the specification example of Table I, the active ports example of Table II, and the port registry example of Table IV.

As shown, the method 500 begins at step 510, where the specifications manager 210 receives port information for all deployed applications 160. The port information may be in the form one or more specifications 166. For example, the specifications manager 210 may receive a specification 166 for Application W of Table IV in a format similar to the specification example of Table I. At step 520, the port registry manager 230 adds the port information to a port registry 168 as "Registered" ports. For example, the port registry manager 230 inserts the first row of the port registry example in Table IV.

At step 530, the active port manager 220 identifies port information for a port in use by all deployed applications (i.e., all active ports). For example, the active port manager 220 may call an operating system library function to identify all active TCP and UDP ports on the server 142. That is, the active port manager 220 may provide information such as the active ports example of Table II. At step 540, the port registry manager 230 adds the identified port information to the port registry 168 as "Active" ports. For example, the port registry manager 230 inserts the third row of the port registry example in Table IV.

At step 550, the port registry manager 230 adds port information to the port registry 168 for all applications 162 to be deployed (i.e., applications 162 that have not yet been deployed). For example, the port registry manager 230 inserts the last row of the port registry example in Table IV. After step 550, the method 500 terminates.

Figure 6:
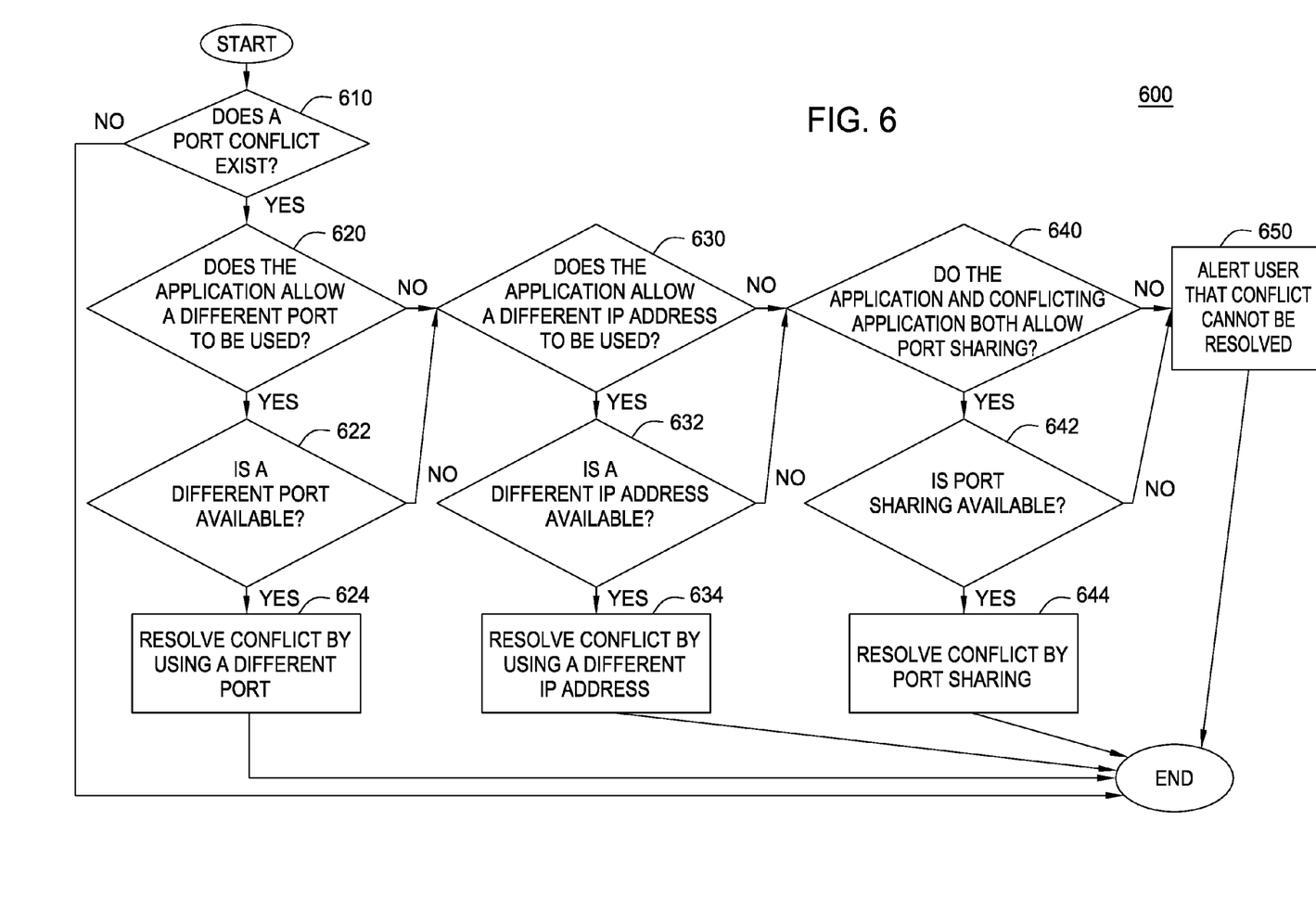
FIG. 6 is a flowchart depicting a method for resolving a port conflict, according to one embodiment of the invention.

FIG. 6 is a flowchart depicting a method 600 for resolving a port conflict, according to one embodiment of the invention. The method 600 is performed by the port conflict resolver 164 of FIG. 1. The steps of method 600 correspond to step 440 of FIG. 4 and are described in conjunction with the port registry example of Table IV.

As shown, the method 600 begins at step 610, where the port registry manager 230 determines whether a port conflict exists. For example, the port registry manager 230 may compare entries in the port registry of Table IV to determine whether a port conflict exists. If a port conflict does not exist, the method 600 terminates. However, if a port conflict exists, the method 600 proceeds to step 620, where the port registry manager 230 determines whether the application 162 allows a different port to be used. For example, the port registry manager 230 may obtain such information from the port registry 168. If the application 162 allows a different port to be used, the method 600 proceeds to step 622, where the port provider 240 determines whether a different port on the same IP address is available. (In one embodiment, the specifications 166 for the application 162 may also specify a list or range of acceptable port numbers. In such a case, the port provider 240 determines whether any of the port numbers in the specified list or range is available on the same IP address.) If so, the method 600 proceeds to step 624, where the deployment manager 270 resolves the port conflict by using the different port. After step 624, the method 600 terminates.

If the application 162 does not allow a different port to be used, or if a different port is not available (e.g., a port number within a specified range), then the method 600 proceeds to step 630, where the port registry manager determines whether the application 162 allows a different IP address to be used. For example, the port registry manager 230 may obtain such information from the port registry 168. If the application 162 allows a different IP address to be used, the method 600 proceeds to step 632, where the IP address provider 250 determines whether a different IP address on the same network interface 148 is available. If so, the method 600 proceeds to step 632, where the deployment manager 270 resolves the port conflict by using the different IP address. After step 632, the method 600 terminates.

If the application 162 does not allow a different IP address to be used, or if a different IP address is not available, then the method 600 proceeds to step 640, where the port registry manager determines whether both the application 162 and a conflicting application allow port sharing. For example, the port registry manager 230 may obtain such information from the port registry 168. If both the application 162 and the conflicting application allow port sharing, the method 600 proceeds to step 642, where the port-sharing provider 260 determines whether a port sharing solution is available. For example, the port-sharing provider 260 may determine whether reverse proxy functionality (e.g., from an operating system or an application) is available on server 142. If so, the method proceeds to step 644, where the deployment manager 270 resolves the port conflict by port sharing. For example, the deployment manager 270 may provide a reverse proxy and configure both the application 162 and the conflicting application to use the reverse proxy. After step 644, the method 600 terminates.

If either the application 162 or the conflicting application does not allow port sharing, then the method 600 proceeds to step 650, where the deployment manager 270 outputs an alert that the port conflict cannot be resolved. The alert may be output to a user via the output device 156. After step 650, the method 600 terminates.

Of course, the embodiments described herein are intended to be illustrative and not limiting of the invention, and other embodiments are broadly contemplated. Those skilled in the art will recognize, for example, that embodiments of the invention may be adapted to detect port conflicts when a user deploys multiple applications 162 at a time.

Advantageously, embodiments of the invention identify and resolve port conflicts during application deployment. In one embodiment, a port conflict resolver may resolve a port conflict by identifying an available port and providing information about the available port to a conflicting application. The port conflict resolver may also resolve a port conflict by identifying an available IP address and providing a port on the available IP address to a conflicting application. Further, if the conflicting applications both allow port sharing, the port conflict resolver may resolve a port conflict by providing port sharing information to the conflicting applications. Further still, the port conflict resolver may resolve port conflicts on systems other than servers, such as clients or peers.

While the foregoing is directed to embodiments of the present invention, other and further embodiments of the invention may be devised without departing from the basic scope thereof, and the scope thereof is determined by the claims that follow.

What is claimed is:

1. A computer-implemented method for resolving a port conflict when deploying a first application, wherein deploying the first application comprises installation of the first application, and comprising configuring one or more processors to perform an operation comprising:
   receiving port configuration information specifying a first port for the first application to use once deployed on a server computer;
   prior to deploying the first application and without user input, identifying a potential conflict between the first application if deployed using the received port configuration information and a second application that also uses the first port when executed;
   determining port information for an available port, such that the first application, if deployed using the determined port information for the available port, would not conflict with the second application;
   prompting for an input selected from at least (i) an approval for deploying the application using the determined port information for the available port; and (ii) alternative port information with which to deploy the first application; and
   based on the input, deploying the first application on the server computer using one of the determined port information and the alternative port information, instead of using the received port information.

2. The computer-implemented method of claim 1, wherein the port conflict is identified based on the received port information and a port registry; wherein the port registry comprises determined port information for (i) deployed applications, (ii) ports in use, and (ii) other applications to be deployed; and wherein the determined port information for an available port is determined using the received port information and the port registry.

3. The computer-implemented method of claim 1, wherein the operation further comprises:
   configuring a firewall to allow the available port if the available port is detected to be blocked by the firewall.

4. The computer-implemented method of claim 1, wherein the determined port information is compatible with a proxy that allows multiple applications to use a single port, wherein the single port is a port associated with the port conflict.

5. The computer-implemented method of claim 1, wherein the port information further includes an application name, a hostname, a subnet mask, a protocol, a network interface, whether another IP address may be used, whether another port designation may be used, and whether port sharing may be used.

6. The computer-implemented method of claim 1, wherein the port information includes an Internet Protocol (IP) address and a port designation selected from at least a port number and a port range.

7. The computer-implemented method of claim 6, wherein a port number specified by the determined port information differs from a port number specified by the received port information.

8. The computer-implemented method of claim 6, wherein an IP address specified by the determined port information differs from an IP address specified by the received port information.

9. A computer-readable device containing a program which, when executed, performs an operation for resolving a port conflict when deploying a first application, wherein deploying the first application comprises installation of the first application, and the operation comprising:
   receiving port configuration information specifying a first port for the first application to use once deployed on a server computer;
   prior to deploying the first application and without user input, identifying a potential conflict between the first application if deployed using the received port configuration information and a second application that also uses the first port when executed;
   determining port information for an available port, such that the first application, if deployed using the determined port information for the available port, would not conflict with the second application;
   prompting for an input selected from at least (i) an approval for deploying the application using the determined port information for the available port; and (ii) alternative port information with which to deploy the first application; and
   based on the input, deploying the first application on the server computer using one of the determined port information and the alternative port information, instead of using the received port information.

10. The computer-readable device of claim 9, wherein the port conflict is identified based on the received port information and a port registry; wherein the port registry comprises port information for (i) deployed applications, (ii) ports in use, and (ii) other applications to be deployed; and wherein the port information for an available port is determined using the received port information and the port registry.

11. The computer-readable device of claim 9, wherein the operation further comprises:
configuring a firewall to allow the available port if the available port is detected to be blocked by the firewall.

12. The computer-readable device of claim 9, wherein the determined port information is compatible with a proxy that allows multiple applications to use a single port, wherein the single port is a port associated with the port conflict.

13. The computer-readable device of claim 9, wherein the port information further includes an application name, a hostname, a subnet mask, a protocol, a network interface, whether another IP address may be used, whether another port designation may be used, and whether port sharing may be used.

14. The computer-readable device of claim 9, wherein the port information includes an Internet Protocol (IP) address and a port designation selected from at least a port number and a port range.

15. A system, comprising:
a processor; and
a memory containing a program, which when executed by the processor is configured to perform an operation for resolving a port conflict when deploying a first application, wherein deploying the first application comprises installation of the first application, and the operation comprising:
receiving port configuration information specifying a first port for the first application to use once deployed on a server computer;
prior to deploying the first application and without user input, identifying a potential conflict between the first application if deployed using the received port configuration information and a second application that also uses the first port when executed;
determining port information for an available port, such that the first application, if deployed using the determined port information for the available port, would not conflict with the second application;
prompting for an input selected from at least (i) an approval for deploying the application using the determined port information for the available port; and (ii) alternative port information with which to deploy the first application; and
based on the input, deploying the first application on the server computer using one of the determined port information and the alternative port information, instead of using the received port information.

16. The system of claim 15, wherein the port conflict is identified based on the received port information and a port registry; wherein the port registry comprises port information for (i) deployed applications, (ii) ports in use, and (ii) other applications to be deployed; and wherein the port information for an available port is determined using the received port information and the port registry.

17. The system of claim 15, wherein the operation further comprises:
configuring a firewall to allow the available port if the available port is detected to be blocked by the firewall.

18. The system of claim 15, wherein the determined port information is compatible with a proxy that allows multiple applications to use a single port, wherein the single port is a port associated with the port conflict.

19. The system of claim 15, wherein the port information further includes an application name, a hostname, a subnet mask, a protocol, a network interface, whether another IP address may be used, whether another port designation may be used, and whether port sharing may be used.

20. The system of claim 15, wherein the port information includes an Internet Protocol (IP) address and a port designation selected from at least a port number and a port range.

* * * * *